(12) United States Patent
Fauteux et al.

(10) Patent No.: US 12,261,306 B2
(45) Date of Patent: Mar. 25, 2025

(54) BATTERIES PROVIDING HIGH POWER AND HIGH ENERGY DENSITY

(71) Applicant: Techtronic Cordless GP, Anderson, SC (US)

(72) Inventors: Denis Gaston Fauteux, Kwai Chung (HK); Aditya Subramanian, Kwai Chung (HK)

(73) Assignee: Techtronic Cordless GP, Anderson, SC (US)

( * ) Notice: Subject to any disclaimer, the term of this patent is extended or adjusted under 35 U.S.C. 154(b) by 249 days.

(21) Appl. No.: 16/739,823

(22) Filed: Jan. 10, 2020

(65) Prior Publication Data

US 2021/0217999 A1    Jul. 15, 2021

(51) Int. Cl.
| | |
|---|---|
| H01M 50/538 | (2021.01) |
| H01M 10/0525 | (2010.01) |
| H01M 50/107 | (2021.01) |
| H01M 50/531 | (2021.01) |

(52) U.S. Cl.
CPC ..... *H01M 50/107* (2021.01); *H01M 10/0525* (2013.01); *H01M 50/531* (2021.01)

(58) Field of Classification Search
CPC ................................................ H01M 10/0525
See application file for complete search history.

(56) References Cited

U.S. PATENT DOCUMENTS

| | | | |
|---|---|---|---|
| 5,323,527 A | * | 6/1994 | Ribordy ............... H01M 6/10 29/623.1 |
| 5,532,083 A | | 7/1996 | McCullough |

(Continued)

FOREIGN PATENT DOCUMENTS

| | | | |
|---|---|---|---|
| CN | 202050030 | * | 11/2011 |
| CN | 202050030 U | * | 11/2011 |

(Continued)

OTHER PUBLICATIONS

Lee et al. Three dimensional thermal-, electrical-, and electrochemical-coupled model for cylindrical wound large format lithium-ion batteries Journal of Power Sources 241 (2013) 20-32 (Year: 2013).*

(Continued)

*Primary Examiner* — Lucas J. O'Donnell
(74) *Attorney, Agent, or Firm* — Norton Rose Fulbright US LLP (57) ABSTRACT

Systems and methods which provide battery configurations for delivering high power while maintaining high energy density are described. Embodiments provide cylindrical batteries configured to deliver high energy density while having high power density at least in part through an electrode configuration disposing electrode material for the cathode and/or anode over an extended length of a longitudinal edge of the respective cathode or anode. An electrode configuration may provide for a continuous length of electrode material disposed along a longitudinal edge of at least one of the cathode or anode. Additionally or alternatively, an electrode configuration may provide for a plurality of electrode tabs of electrode material spaced out along a longitudinal edge of at least one of the anode or cathode.

25 Claims, 6 Drawing Sheets

(56) References Cited

U.S. PATENT DOCUMENTS

| | | | |
|---|---|---|---|
| 8,142,928 B2* | 3/2012 | Blomgren | H01M 4/70 |
| | | | 429/211 |
| 9,300,004 B2 | 3/2016 | Barone et al. | |
| 2002/0160253 A1 | 10/2002 | Vaidyanathan | |
| 2004/0023107 A1* | 2/2004 | Nakanishi | H01M 50/566 |
| | | | 429/211 |
| 2009/0104520 A1 | 4/2009 | Marple | |
| 2011/0123836 A1* | 5/2011 | Jang | H01M 10/425 |
| | | | 429/7 |
| 2013/0221924 A1 | 8/2013 | Sim et al. | |
| 2013/0252054 A1* | 9/2013 | Barone | H01M 50/534 |
| | | | 429/94 |
| 2018/0062159 A1* | 3/2018 | El-Kady | H01M 4/364 |
| 2019/0372067 A1 | 12/2019 | Fieldbinder et al. | |
| 2020/0343520 A1* | 10/2020 | Jeong | H01M 50/50 |
| 2020/0358069 A1* | 11/2020 | Imamura | H01M 10/0585 |

FOREIGN PATENT DOCUMENTS

| | | | |
|---|---|---|---|
| EP | 2424002 A1 * | 2/2012 | |
| EP | 1851812 B1 | 5/2012 | |
| JP | 2018186250 | * | 11/2018 |
| JP | 2018186250 A | * | 11/2018 |
| KR | 20180107008 | * | 10/2018 |
| KR | 20180107008 A | * | 10/2018 |
| WO | WO-2018192773 A1 | | 10/2018 |
| WO | WO-2019016536 A1 | | 1/2019 |

OTHER PUBLICATIONS

Patent Cooperation Treaty, International Search Report and Written Opinion issued for PCT Application No. PCT/IB2020/062057, dated May 20, 2021, 13 pages.

European Patent Office, Communication, Extended European Search Report issued for European Patent Application No. 20911807.4, dated Sep. 4, 2024, 7 pages.

* cited by examiner

BATTERIES PROVIDING HIGH POWER AND HIGH ENERGY DENSITY

TECHNICAL FIELD

The present invention relates generally to batteries and, more particularly, to battery configured to provide high power and high energy density.

BACKGROUND OF THE INVENTION

The use of various forms of batteries has become nearly ubiquitous in today's world. As more and more portable or cordless devices, such as power tools (e.g., drills, saws, grass trimmers, blowers, sanders, etc.), small appliances (e.g., mixers, blenders, coffee grinders, etc.), communications devices (e.g., smartphones, personal digital assistants, etc.), and office equipment (e.g., computers, tablets, printers, etc.), are in widespread use, the use of battery technologies of varying chemistry and configuration is commonplace.

Lithium-ion battery (LiB) configurations have gained popularity in recent years for use with respect to portable or cordless devices. LiBs, although potentially providing a less stable chemistry (e.g., containing a flammable electrolyte) than battery configurations such as NiCd, nevertheless have a higher energy density than many rechargeable battery configurations (e.g., NiCd), typically have no memory effect, and experience low self-discharge and thus provide a rechargeable battery configuration commonly utilized in today's portable or cordless devices.

The size and weight of portable or cordless devices is often an important consideration. As the size and weight of an on-board rechargeable battery system, often including multiple individual batteries in the form of a battery pack, often contributes appreciably to the overall size and/or weight of the portable or cordless device, the size and weight of rechargeable batteries can be important in the design of the host devices. Such size and weight concerns are counterbalanced with the need for storage and delivery of sufficient power to enable the effective and desired use of the host portable or cordless device.

BRIEF SUMMARY OF THE INVENTION

The present invention is directed to systems and methods which provide battery configurations for delivering high power while maintaining high energy density. Embodiments of the present invention provide battery implementations in a roll configuration that can deliver high energy density and which have a high power density. Lithium-ion battery (LiB) implementations of embodiments, for example, deliver energy density of greater than 110 Watt hours per kilogram (Wh/kg) and have power density of greater than 2 kilo Watts per kilogram (kW/kg).

A cylindrical battery implementation of embodiments of the invention comprises an anode, a cathode, an electrolyte, and a cylindrical housing, wherein the anode and cathode are juxtaposed in a roll configuration within the cylindrical housing and the electrolyte is disposed between facing surfaces of the juxtaposed anode and cathode in the roll configuration. The cylindrical battery of embodiments is configured to deliver high energy density while having high power density in accordance with concepts of the present invention at least in part through an electrode configuration disposing electrode material for the cathode and/or anode over an extended length of a longitudinal edge of the respective cathode or anode. The extended length of the longitudinal edge of the cathode or anode over which the electrode material is disposed may, for example, comprise a length that is over twice the outer circumference of the roll configuration, a length that is half or greater the length of the longitudinal edge of the cathode or anode, a length that is substantially the length of the longitudinal edge of the cathode or anode, etc.

In accordance with some embodiments, an electrode configuration disposing electrode material for the cathode and/or anode over an extended length of a longitudinal edge of the respective cathode or anode provides for a continuous length of electrode material disposed along a longitudinal edge of at least one of the cathode or anode, wherein the continuous length of electrode material is a length of at least twice a size of an outer circumference of the roll configuration of the cathode/anode. The continuous length of electrode material may, for example, be continuously coupled to a terminal of a cylindrical housing of the battery along a longitudinal edge of the electrode. Such a battery configuration may be utilized to provide a cylindrical cell with low impedance, improved structural stability, etc. in accordance with concepts of the present invention.

Additionally or alternatively, in accordance with some embodiments, an electrode configuration disposing electrode material for the anode and/or cathode over an extended length of a longitudinal edge of the respective anode or cathode provides for a plurality of electrode tabs of electrode material spaced out along a longitudinal edge of at least one of the anode or cathode, wherein the plurality of electrode tabs of electrode material are spaced out over a length of at least twice a size of an outer circumference of the roll configuration of the anode/cathode. The plurality of electrode tabs may, for example, comprise at least 4 electrode tabs (e.g., 4-10 electrode tabs) that are unequally spaced throughout the length of at least the size of the outer circumference of the roll configuration, wherein the unequally spaced electrode tabs are configured to line up in juxtaposition when a planar body of the respective anode or cathode is rolled in the roll configuration. The plurality of electrode tabs may, for example, be coupled to a terminal of a cylindrical housing of the battery as a single juxtaposed tab unit. Such a battery configuration may be utilized to provide a cylindrical cell with relatively low impedance while facilitating coupling to the battery terminal.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Cell construction techniques utilized in manufacturing various forms of batteries often result in batteries having less than desirable characteristics. For example, energy losses arising from electrical contact resistance at interfaces between electrode layers and at contacts with current-collectors in current battery configurations can be as high as 20% of the entire energy flow of the batteries, under typical operating conditions. Accordingly, battery configurations provided according to embodiments of the present invention implement cell construction configured to reduce the impedance of the batteries.

FIGS. 1A-1C and 2A-2C show embodiments of battery configurations implementing cell construction techniques providing reduced battery impedance. Battery configurations 100 of FIGS. 1A-1C and 200 of FIGS. 2A-2C comprise a cathode (shown as cathode 110 in FIGS. 1A-1C and cathode 210 in FIGS. 2A-2C) and an anode (shown as anode 120 in FIGS. 1A-1C and anode 220 in FIGS. 2A-2C), each of which may be formed from a planar body of suitable material. In a lithium-ion battery (LiB) implementation, for example, cathodes 110 210 may be comprised of a planar body (e.g., a sheet or panel) coated with or formed from a lithium oxide alloy or compound, such as lithium cobalt oxide ($LiCoO_2$), lithium nickel manganese cobalt oxide ($LiNi_xMn_yCo_zO_2$ (x+y+z=1) or NMC), lithium nickel cobalt aluminum oxide ($LiNi_xCo_yAl_zO_2$ (x+y+z=1)), a polyanion (e.g., such as lithium iron phosphate ($LiFePO_4$)), a spinel (such as lithium manganese oxide ($LiMn_2O_4$, $Li_2MnO$, or LMO)), etc. In such a LiB implementation, anodes 120 and 220 may be comprised of a planar body (e.g., a sheet or panel) of graphite ($C_6$), graphene (e.g., graphene encapsulated silicon (Si) nanoparticles), silicon or silicon oxide, etc.

Embodiments of the present invention provide battery implementations in a roll or cylindrical configuration that can deliver high energy density and which have a high power density. A cylindrical battery implementation of embodiments of the invention comprises an anode, a cathode, an electrolyte, and a cylindrical housing. Accordingly, cathodes 110 and 210 and anodes 120 and 220 of battery configurations 100 and 200 are preferably rolled together longitudinally, as shown in FIG. 3, to form a battery cell. In the rolled configuration, anode 120/220 and cathode 110/210 are in juxtaposed, facing spirals presenting a cylindrical cell having an outer circumference denoted as $C_O$ in FIG. 3. Although not shown in FIGS. 1A-1C and 2A-2C, an electrolyte (shown as electrolyte 301 in FIG. 3) is disposed between facing surfaces of the juxtaposed anode and cathode in the roll configuration. In a LiB implementation, for example, electrolyte 301 may comprise organic solvents, polymer electrolyte, ceramic solid electrolyte, ionic liquid electrolyte, etc. In accordance with embodiments of the invention, electrolyte 301 may comprise a lithium salt in an organic solvent, such as an organic carbonate (e.g., ethylene carbonate or diethyl carbonate) containing complexes of lithium ions (e.g., an anion salt, such as lithium hexafluorophosphate ($LiPF_6$), lithium hexafluoroarsenate monohydrate ($LiAsF_6$), lithium perchlorate ($LiClO_4$), lithium tetrafluoroborate ($LiBF_4$), lithium triflate ($LiCF_3SO_3$), etc.).

Figure 1A:
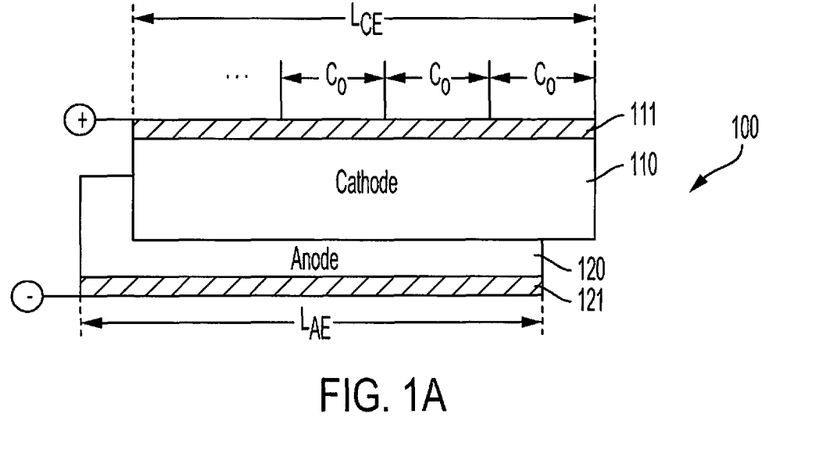
FIGS. 1A-1C show battery configurations implementing cell construction techniques using a continuous electrode member configured for providing reduced battery impedance in accordance with embodiments of the present invention.
Figure 1B:
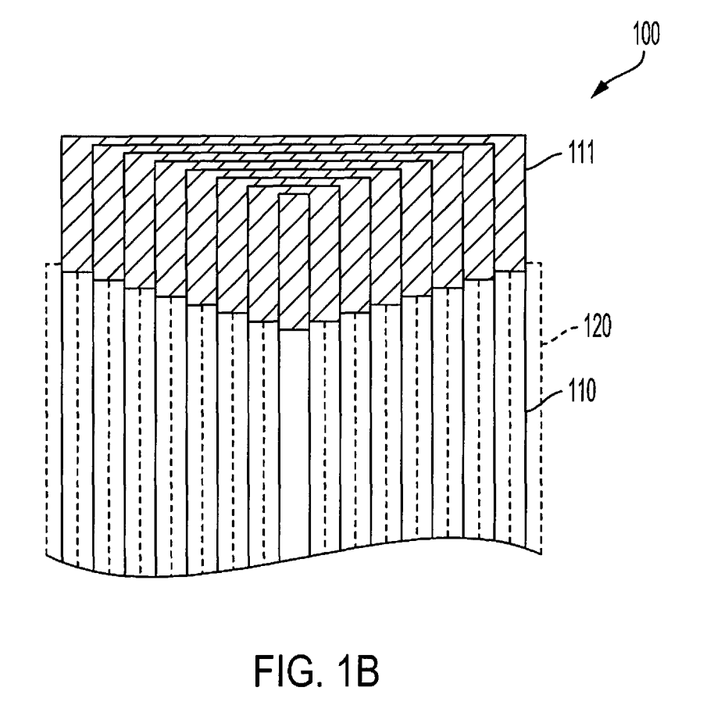
Figure 1C:
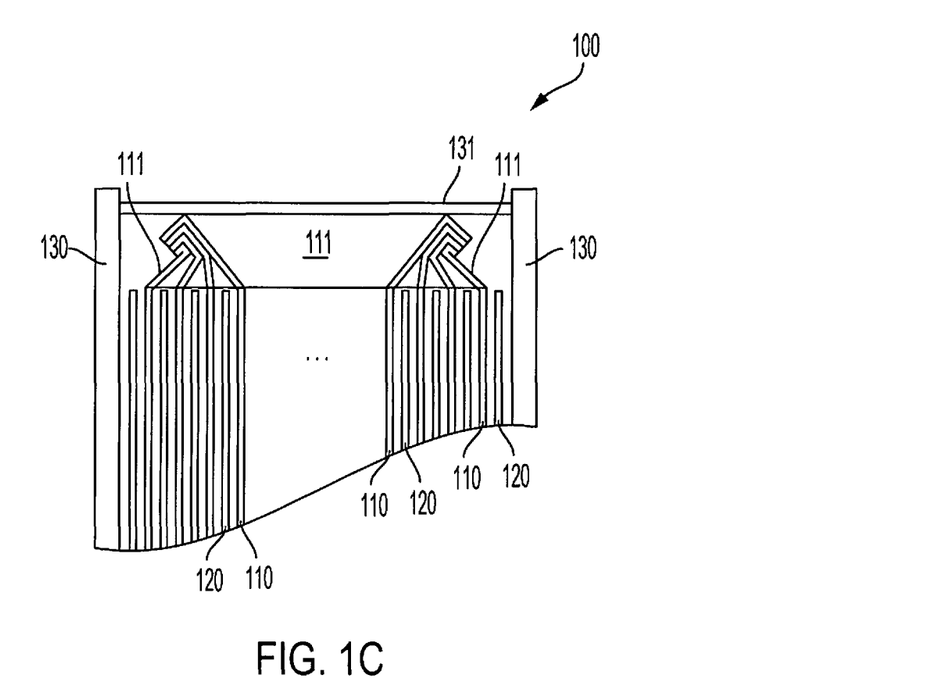
Figure 2A:
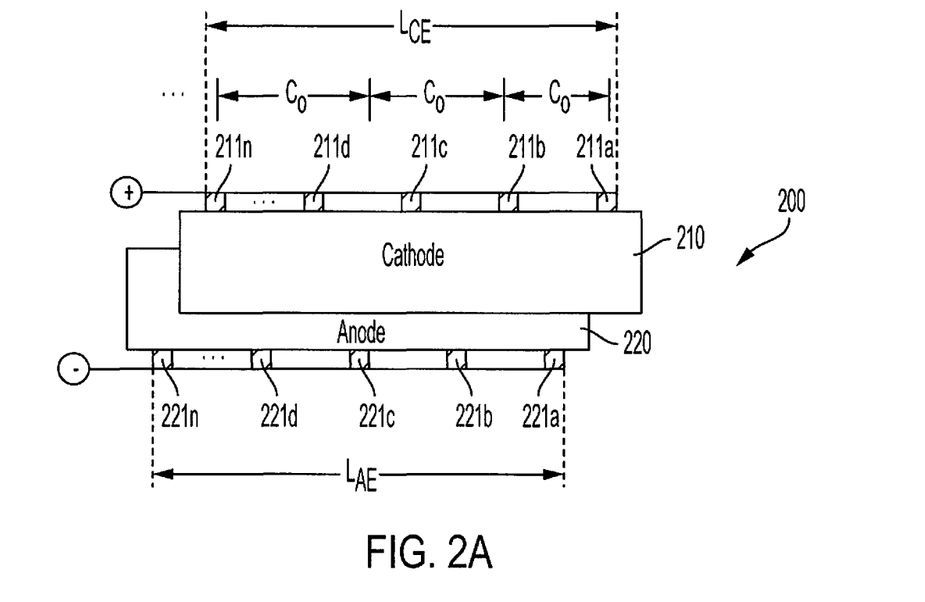
FIGS. 2A-2C show battery configurations implementing cell construction techniques using a plurality of electrode tabs configured for providing reduced battery impedance in accordance with embodiments of the present invention.
Figure 2B:
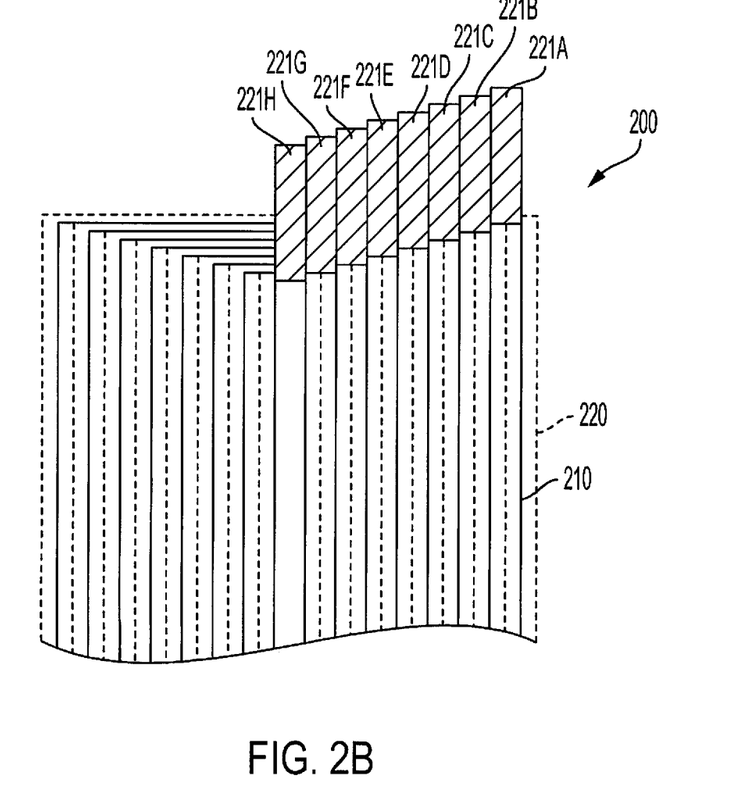
Figure 2C:
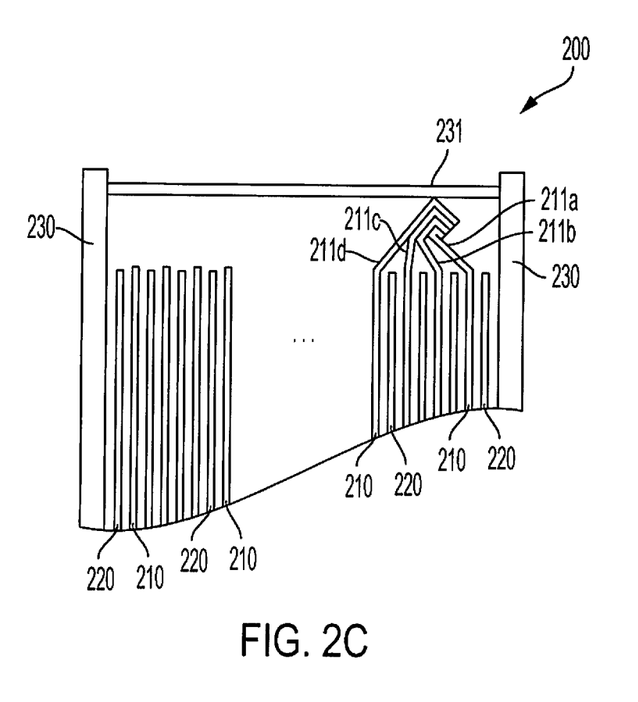
Figure 3:
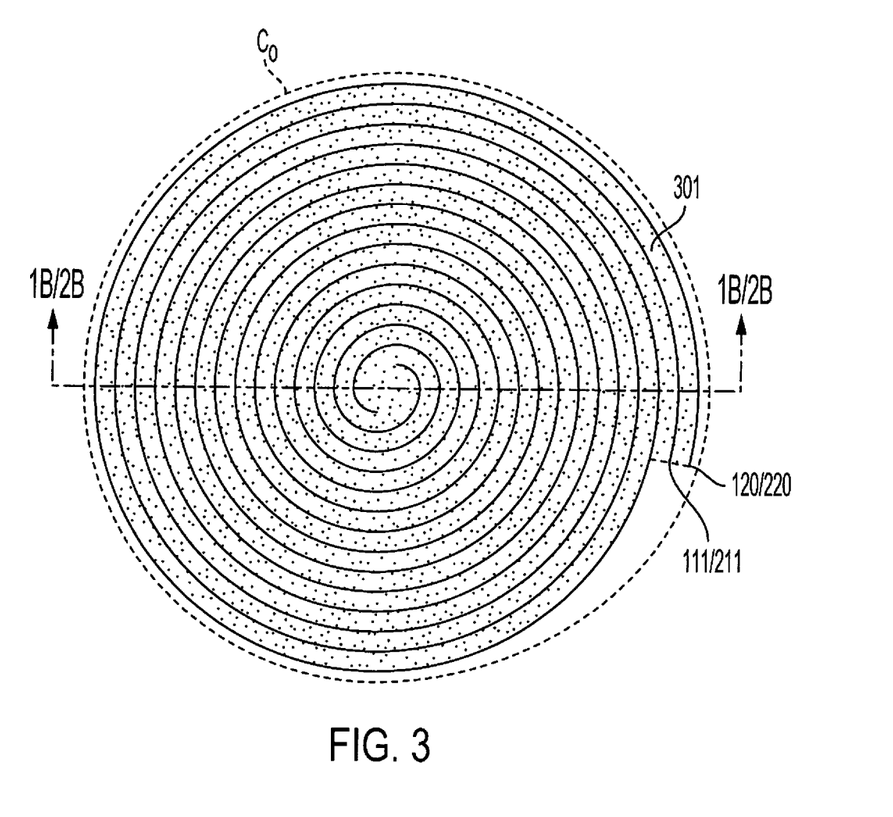
FIG. 3 shows a cylindrical cell formed from a roll configuration of an anode and cathode having an electrode configuration disposing electrode material for the cathode and/or anode over an extended length of a longitudinal edge of the respective cathode or anode in accordance with embodiments of the present invention.

The exemplary battery configurations of the embodiments of FIGS. 1A-1C and 2A-2C are configured for delivering high power while maintaining high energy density according to concepts of the present invention. In particular, battery configurations 100 of FIGS. 1A-1C and 200 of FIGS. 2A-2C provide an electrode configuration providing electrode material for the cathode and/or anode over an extended length of a longitudinal edge of the respective cathode or anode. For example, cathodes 110 and 210 may comprise a conductive sheet or foil material (e.g., aluminum) substrate coated with a lithium oxide alloy or other compound, whereas anodes 120 and 220 may comprise a conductive sheet or foil material (e.g., copper) substrate coated with graphite ($C_6$), graphene (e.g., graphene encapsulated silicon (Si) nanoparticles), silicon or silicon oxide, etc. As will be better understood from the discussion below, battery configuration 100 of FIGS. 1A-1C provides a continuous electrode (e.g., continuous strip of the conductive sheet material extending beyond the respective cathode and/or anode coating material) design as may be utilized with respect to battery anodes and/or cathodes. In another implementation, battery configuration 200 of FIGS. 2A-2C provides a multiple electrode tab (e.g., tabbed, notched, crenulated, etc. instances of conductive sheet material extending beyond the respective cathode and/or anode coating material) design as may be utilized with respect to the battery anodes and/or cathodes. The extended length of the longitudinal edge of the cathode ($L_C$) or anode ($L_A$) over which the electrode material is disposed in battery configurations 100 and 200 of embodiments may, for example, comprise a length that is over twice the outer circumference of the roll configuration (i.e., length of cathode electrode, $L_{CE}$, and length of anode electrode, $L_{AE}$, $>2 \cdot C_O$). The extended length over which the electrode material of embodiments of the invention is disposed may, for example, comprise a length that is half or greater the length of the longitudinal edge of the cathode or anode, a length that is substantially the length of the longitudinal edge of the cathode or anode, etc.

The electrode design of battery configuration 100 may, for example, be utilized for either or both anode 110 and cathode 120 of a particular battery implementation. Additionally or alternatively, the electrode design of battery configuration 200 may be utilized for either or both anode 210 and cathode 220 of a particular battery implementation. In some battery implementations, for example, the electrode design of battery configuration 100 may be utilized with respect to either the anode or cathode while the electrode design of battery configuration 200 may be utilized with respect to the other of the cathode or anode. Such a mixed electrode design configuration may, for example, be utilized to provide a battery configuration having reduced impedance while accommodating manufacturing challenges with respect to attaching or otherwise coupling electrodes of one of the anode or cathode to a corresponding terminal of the battery.

Having generally described battery configurations in which the electrode configuration disposes electrode material for the cathode and/or anode over an extended length of a longitudinal edge of the respective cathode or anode, exemplary embodiments in which a continuous electrode design is utilized with respect to battery anodes and/or cathodes will be described in more detail with reference to FIGS. 1A-1C. In the example as illustrated in FIG. 1A, cathode 110 comprises a planar body having electrode member 111 disposed along a longitudinal edge of the cathode planar body, wherein the electrode member comprises a continuous length of an electrode material. Further, in the example as illustrated in FIG. 1A, anode 120 comprises a planar body having electrode member 121 disposed along a longitudinal edge of the anode planar body, wherein the electrode member comprises a continuous length of an electrode material.

Cathode 110 and anode 120 of battery configuration 100 may be rolled into a roll configuration along a longitudinal axis of the cathode and anode planar bodies to provide a cylindrical cell having an outer circumference of size $C_O$ as shown in FIG. 3. In accordance with embodiments of the invention, the continuous length of an electrode material of electrode member 111 is of a length of at least twice a size of an outer circumference of the roll configuration. For example, as shown in FIG. 1A, the length of electrode member 111 may be equal to (e.g., electrode member 111 may extend the full extent of the length of the cathode) or substantially equal to (e.g., electrode member 111 may extend a length slightly less than the length of the cathode, for example at least 90% the length of the cathode, such as to facilitate handling of the cathode, manufacturing of the battery, etc.) a length of the longitudinal edge of the cathode planar body. Similarly, as shown in FIG. 1A, the length of electrode member 121 may be equal to (e.g., electrode member 121 may extend the full extent of the length of the anode) or substantially equal to (e.g., electrode member 121 may extend a length slightly less than the length of the anode, for example at least 90% the length of the anode, such as to facilitate handling of the anode, manufacturing of the battery, etc.) a length of the longitudinal edge of the anode planar body.

FIG. 1B shows a partial cross sectional view along line 1B/2B-1B/2B of FIG. 3 in a slightly isometric perspective so as to make the concentric spiral portions of the electrode material visible. As can be seen in FIG. 1B, the electrode material of electrode member 111 (cathode 110) extends beyond the ends of the concentric spiral portions of anode 120 that are interleaved with the concentric spiral portions of cathode 110 when the cathode and anode are rolled into the roll configuration. Electrode member 111 is thus positioned (e.g., is clear of anode 120) for forming into an electrode unit for coupling to a terminal of a cylindrical battery housing in which the cylindrical cell is disposed. For example, as illustrated in the partial cross section view of FIG. 1C, the roll configuration of cathode 110 and anode 120 may be disposed within cylindrical housing 130 and cathode 110 coupled to positive terminal 131 disposed at an end of the cylindrical housing (anode 120 being similarly coupled to a negative terminal, not shown). Because electrode member 111 extends along an appreciable length of the longitudinal length of cathode 110 (e.g., length of cathode electrode is at least a length greater than twice $C_O$ ($L_{CE} > 2 \cdot C_O$), and in the illustrated example a length equal to or substantially equal to the length of the cathode), electrode member 111 provides a configuration facilitating a cylindrical cell with low impedance, and thus battery configurations providing high power and high energy density.

It should be appreciated that, although not shown in FIG. 1C in order to simplify the illustration, electrolyte 301 is disposed between facing surfaces of juxtaposed anode 110 and cathode 120 in the roll configuration. Also not shown in FIG. 1C, an adhesive may be applied between an outer surface of anode 120 and an inner surface of cylindrical housing 130, such as to secure the cylindrical cell from movement within the battery.

In providing a low impedance battery implementation, electrode member 111 of embodiments is continuously coupled to positive terminal 131 of cylindrical housing 130 along a longitudinal edge of the electrode member. For example, after winding cathode 110 and anode 120 into the roll configuration, a smoothening process may be applied with respect to the distal edge the electrode material of electrode member 111 to provide a uniform height with respect to the concentric spiral portions of the electrode material of electrode member 111. Such smoothening may include trimming the electrode material, compressing together a plurality of adjacent ones of the concentric portions, folding or rolling over adjacent ones of the concentric portions that are compressed together, rubbing the bare foil to form a compressed uniform plane/surface, etc. FIG. 1C, for example, illustrates an example in which all of the adjacent concentric portions of electrode material of electrode member 111 are compressed together (e.g., aggregated) and folded over by a smoothening process to thereby provide a low impedance electrode member presenting a uniform surface for continuously coupling to positive terminal 131. The concentric portions of electrode material that are compressed together may, for example, be laser welded and/or otherwise conductively affixed to one another (e.g., soldering, conductive epoxy, etc.). Additionally or alternatively, the uniform surface provided by the compressed together concentric portions of the electrode material may be continuously connected to a corresponding surface, such as a surface of positive terminal 131, by laser welding, spot welding, resistance welding, etc. and/or other means of conductive affixing (e.g., soldering, conductive epoxy, etc.).

It should be appreciated that, although the example illustrated in FIG. 1C shows electrode material of electrode member 111 directly coupled to a surface of positive terminal 131, coupling between electrode member 111 and positive terminal 131 may be indirect according to embodiments of the invention. For example, battery monitoring electronics (e.g., over-charge and/or deep-discharge protection circuitry) may be disposed between the cylindrical cell and one or more terminals of the cylindrical housing. In such an embodiment, the uniform surface provided by the compressed together concentric portions of the electrode material may be continuously connected to a surface (e.g., ring trace) of the intervening battery monitoring electronics.

Although the partial cross section view of FIGS. 1B and 1C illustrate the end of the cylindrical cell at which electrode member 111 extends, it should be appreciated that the other end of the cylindrical cell corresponding to the example of FIG. 1A similarly provides an end at which electrode member 121 extends. Thus, a smoothening process may be applied with respect to the electrode material of electrode member 121, and the electrode material of electrode member 121 continuously connected to a corresponding surface, such as a surface of a negative terminal, as described above with respect to electrode member 111.

It can be appreciated that, in accordance with the example of FIGS. 1A-1C, a continuous length of electrode member 111 couples an appreciable portion of cathode 111 to positive terminal 131 and a continuous length of electrode member 121 couples an appreciable portion of cathode 121 to a negative terminal (not shown). Such an implementation provides a cylindrical cell configuration with low impedance (e.g., alternating current internal resistance (ACIR)<5 mohms and direct current internal resistance (DCIR)<10 mohms in an exemplary LiB implementation). Moreover, the continuous length of electrode material aggregated according to embodiments of the invention provides improved structural stability with respect to the cylindrical cell disposed within the battery housing.

Having described embodiments in which a continuous electrode design is utilized, exemplary embodiments in which a multiple tab electrode design is utilized with respect to battery anodes and/or cathodes will be described in detail with reference to FIGS. 2A-2C. In the example as illustrated in FIG. 2A, cathode 210 comprises a planar body having electrode tabs 211a-211n (e.g., tabbed, notched, crenulated, etc. instances of conductive sheet material) disposed along a longitudinal edge of the cathode planar body, wherein the electrode tabs comprise at least 4 electrode tabs. Further, in the example as illustrated in FIG. 2A, anode 220 comprises a planar body having electrode tabs 221a-221n disposed along a longitudinal edge of the anode planar body, wherein the electrode tabs comprise at least 4 electrode tabs. The at least 4 electrode tabs provided with respect to the cathode and/or anode may, for example, correspond to a number of concentric revolutions of the cathode/anode when rolled in a roll configuration (e.g., a roll configuration in which a planar body of a cathode completes 6 revolutions may comprise 6 electrode tabs). In a cylindrical battery implementation of embodiments, 8 to 9 electrode tabs disposed along a length substantially equal to the length of the cathode/anode are utilized to provide an optimum reduction in the battery impedance (e.g., addition of additional electrode tabs may not appreciably reduce impedance further). Although the example of FIG. 2A shows a same number of electrode tabs 211a-211n and electrode tabs 221a-221n, embodiments of the invention may utilize different numbers of electrode tabs with respect to the cathode and electrode.

Cathode 210 and anode 220 of battery configuration 200 may be rolled into a roll configuration along a longitudinal axis of the cathode and anode planar bodies to provide a cylindrical cell having an outer circumference of size $C_O$ as shown in FIG. 3. In accordance with embodiments of the invention, the length over which electrode material of electrode tabs 211a-211n is spread is a length of at least twice a size of an outer circumference of the roll configuration (i.e., length over which the cathode electrodes are disposed, $L_{CE}$, and length over which the anode electrodes are disposed, $L_{AE}$, >2·$C_O$). For example, as shown in FIG. 2A, electrode tabs 211a-211n may be spread over a length equal to (e.g., the spread of electrode tabs 211a-211n may extend the full extent of the length of the cathode) or substantially equal to (e.g., the spread of electrode tabs 211a-211n may extend a length slightly less than the length of the cathode, for example at least 90% the length of the cathode, such as to facilitate juxtaposed alignment of the tabs when in the rolled configuration) a length of the longitudinal edge of the cathode planar body. Similarly, as shown in FIG. 2A, electrode tabs 221a-221n may be spread over a length equal to (e.g., the spread of electrode tabs 221a-221n may extend the full extent of the length of the anode) or substantially equal to (e.g., the spread of electrode tabs 221a-221n may extend a length slightly less than the length of the anode, for example at least 90% the length of the anode, such as to facilitate juxtaposed alignment of the tabs when in the rolled configuration) a length of the longitudinal edge of the anode planar body.

FIG. 2B shows a partial cross sectional view along line 1B/2B-1B/2B of FIG. 3 in a slightly isometric perspective so as to make portions of the concentric electrode tabs visible. As can be seen in FIG. 2B, the electrode material of electrode tabs 211a-211n for cathode 210 extends beyond the end of the longitudinal edge of anode 220 when rolled into the roll configuration. Electrode tabs 211a-211n is thus positioned for coupling to a terminal of a cylindrical battery housing in which the cylindrical cell is disposed. For example, as illustrated in the partial cross section view of FIG. 2C, the roll configuration of cathode 210 and anode 220 may be disposed within cylindrical housing 230 and cathode 210 coupled to positive terminal 231 disposed at an end of the cylindrical housing (anode 220 being similarly coupled to a negative terminal, not shown). Because electrode tabs 211a-211n are spread along an appreciable length (e.g., at least a length greater than twice $C_O$ ($L_{CE}$, >2·$C_O$), and in the illustrated example a length equal to or substantially equal to the length of the cathode) of the longitudinal length of cathode 210, electrode tabs 211a-211n provide a configuration facilitating a cylindrical cell with relatively low impedance, and thus battery configurations providing relatively high power and high energy density.

It should be appreciated that, although not shown in FIG. 2C in order to simplify the illustration, electrolyte 301 is disposed between facing surfaces of juxtaposed anode 210 and cathode 220 in the roll configuration. Also not shown in FIG. 2C, an adhesive (e.g., an expansion tape, glue, sticky tape, etc.) may be applied between an outer surface of anode 220 and an inner surface of cylindrical housing 230, such as to secure the cylindrical cell from movement within the battery.

In providing a relatively low impedance battery implementation, electrode tabs 211a-211n of embodiments are collectively coupled to positive terminal 231 of cylindrical housing 230. For example, electrode tabs 211a-211n are preferably unequally spaced throughout the length of at least twice the size of the outer circumference of the roll configuration (e.g., unequally spaced throughout the lengths $L_{CE}$ and/or $L_{AE}$, wherein $L_{CE}$ and $L_{AE}$, >2·$C_O$), wherein the unequally spaced first electrode tabs are configured to line up in juxtaposition when the planar body of cathode 210 is rolled in the roll configuration. After winding cathode 210 and anode 220 into the roll configuration, a smoothening process may be applied with respect to the distal edge the electrode material of electrode tabs 211a-211n to provide a uniform height with respect to the juxtaposed electrode material of electrode tabs 211a-211n. Such smoothening may include trimming the electrode material, compressing together a plurality of adjacent ones of the electrode tabs, folding or rolling over adjacent ones of the electrode tabs that are compressed together, etc. FIG. 2C, for example, illustrates an example in which all of juxtaposed electrode tabs 211a-211n are compressed together (e.g., aggregated) and folded over by a smoothening process to thereby provide a low impedance juxtaposed tab unit presenting a uniform surface for coupling to positive terminal 231. The portions of electrode material that are compressed together may, for example, be laser welded and/or otherwise conductively affixed to one another (e.g., soldering, conductive epoxy, etc.). Additionally or alternatively, the uniform surface provided by the compressed together portions of the electrode material may be connected to a corresponding surface, such as a surface of positive terminal 231, by laser welding, spot welding, resistance welding, etc. and/or other means of conductive affixing (e.g., soldering, conductive epoxy, etc.).

It should be appreciated that, although the example illustrated in FIG. 2C shows electrode material of electrode tabs 211a-211n directly coupled to a surface of positive terminal 231, coupling between electrode tabs 211a-211n and positive terminal 231 may be indirect according to embodiments of the invention. For example, battery monitoring electronics (e.g., over-charge and/or deep-discharge protection circuitry) may be disposed between the cylindrical cell and one or more terminals of the cylindrical housing. In such an embodiment, the uniform surface provided by the compressed together portions of the electrode material may be connected to a surface (e.g., solder pad) of the intervening battery monitoring electronics.

Although the partial cross section view of FIGS. 2B and 2C illustrate the end of the cylindrical cell at which electrode tabs 211a-211n extend, it should be appreciated that the other end of the cylindrical cell corresponding to the example of FIG. 2A similarly provides an end at which electrode tabs 221a-221n extend. Thus, a smoothening process may be applied with respect to the electrode material of electrode tabs 221a-221n, and the electrode material of electrode tabs 221a-221n connected to a corresponding surface, such as a surface of a negative terminal, as described above with respect to electrode tabs 211a-211n.

It can be appreciated that, in accordance with the example of FIGS. 2A-2C, electrode tabs 211a-211n couple an appreciable portion of cathode 211 to positive terminal 231 and electrode tabs 221a-221n couple an appreciable portion of cathode 221 to a negative terminal (not shown). Such an implementation provides a cylindrical cell configuration with relatively low impedance.

In accordance with embodiments of the invention, a method for providing a cylindrical battery implementation in accordance with battery configurations 100 and 200 described above includes juxtaposing a planar body of the anode (e.g., anode 120 or 220) and a planar body of the cathode (e.g., cathode 110 or 120) in a roll configuration with an electrolyte (e.g., electrolyte 301) disposed between facing surfaces of the juxtaposed anode and cathode planar bodies. As described above, at least one of the anode or the cathode comprises an electrode configuration (e.g., electrode member 111, electrode member 121, electrode tabs 211a-211n, and/or electrode tabs 221a-221n) disposing electrode material along a longitudinal edge of the planar body over a length of at least twice a size of an outer circumference (e.g., $C_O$) of the roll configuration. The electrode configuration may, for example, comprise an electrode member having a continuous length of the electrode material of at least twice the size of the outer circumference of the roll configuration (e.g., the continuous length of the first electrode material may be equal to or substantially equal to a length of the longitudinal edge of the first planar body). As another example, the electrode configuration may comprise a plurality of electrode tabs of the electrode material spaced out over the length of at least twice the size of the outer circumference of the roll configuration (e.g., the plurality of electrode tabs may comprise at least 4 electrode tabs unequally spaced throughout the length of at least twice the size of the outer circumference of the roll configuration, wherein the unequally spaced electrode tabs are configured to line up in juxtaposition when the planar body is rolled in the roll configuration).

According to embodiments of the method for providing the cylindrical battery implementation, a smoothening process may be implemented with respect to the electrode configuration to provide a uniform surface for coupling to a corresponding terminal of the cylindrical battery. The juxtaposed anode and cathode planar bodies rolled in the roll configuration may be disposed within a cylindrical housing (e.g., cylindrical housing 130 or cylindrical housing 230) of the cylindrical battery, and the electrode material of the at least one of a respective terminal (e.g., electrode member 111 coupled to positive terminal 131, electrode member 121 coupled to a negative terminal, electrode tabs 211a-211n coupled to positive terminal 231, and/or electrode tabs 221a-221n coupled to a negative terminal) of the cylindrical housing. Coupling the electrode material to the terminal may, for example, comprise coupling the electrode member to the terminal of the cylindrical housing so that the electrode member is continuously connected along a longitudinal edge of the electrode member of a continuous length of electrode material. As another example, coupling the electrode material to the terminal may comprise coupling the plurality of electrode tabs to the terminal of the cylindrical housing as a single juxtaposed tab unit.

A method for providing a cylindrical battery implementation consistent with the example above may be utilized in providing lithium-ion battery (LiB) implementations according to embodiments of the invention. LiBs provided in accordance with such a method (e.g., LiBs utilizing one of battery configurations 100 and 200) are configured for delivering energy density of greater than 110 Watt hours per kilogram (Wh/kg) and have power density of greater than 2 kiloWatts per kilogram (kW/kg).

Batteries provided using battery configurations implementing cell construction techniques providing reduced battery impedance according to embodiments of the invention are well suited for use in construction of various configurations of high power and high energy density battery packs. For example, batteries in accordance with embodiments of the invention may be used in constructing battery packs having a plurality of individual cylindrical cells in a 5 serial 1 parallel (5S1P) construction, a 5 serial 2 parallel (5S2P) construction, a 7 serial 2 parallel (7S2P) construction, a 10 serial 1 parallel (10S1P) construction, a 10 serial 2 parallel (10S2P) construction, a 10 serial 3 parallel (10S3P) construction, a 20 serial 1 parallel (20S1P) construction, a 20 serial 2 parallel (20S2P) construction, a 20 serial 3 parallel (20S3P) construction, as well as other multiple battery constructions.

The tables below show the characteristics of 5 Ah cells in 21700 format implemented using a continuous length of electrode material configuration in accordance with the example above and which have been made into a 5S1P construction battery pack with maximum charge voltage of 21V.

| Current (A) | Average Voltage/cell (V) | Energy Delivered (Wh) | Average voltage of pack (V) | Energy delivered from Pack (Wh) | Energy Density (Wh/kg) | Power Density (W/kg) | Energy Density (Wh/L) | Power Density (W/L) |
|---|---|---|---|---|---|---|---|---|
| 10 | 3.65 | 18.25 | 18.25 | 91.25 | 186.2 | 372.4 | 185.5 | 370.9 |
| 20 | 3.6 | 18 | 18 | 90 | 183.7 | 734.7 | 182.9 | 731.7 |
| 30 | 3.55 | 17.75 | 17.75 | 88.75 | 181.1 | 1086.7 | 180.4 | 1082.3 |

| | | | | | | | | |
|---|---|---|---|---|---|---|---|---|
| 40 | 3.5 | 17.5 | 17.5 | 87.5 | 178.6 | 1428.6 | 177.8 | 1422.8 |
| 50 | 3.45 | 15.525 | 17.25 | 77.625 | 158.4 | 1760.2 | 157.8 | 1753.0 |
| 60 | 3.4 | 12.75 | 17 | 63.75 | 130.1 | 2081.6 | 129.6 | 2073.2 |
| 70 | 3.3 | 11.055 | 16.5 | 55.275 | 112.8 | 2357.1 | 112.3 | 2347.6 |

| | |
|---|---|
| Capacity (Ah) | 5 |
| Weight of cell (kg) | 0.078 |
| Volume of cell (L) | 0.024 |
| Weight of pack (kg) | 0.490 |
| Volume of Pack (L) | 0.492 |

The batteries and battery packs constructed therefrom, provide high power and high energy density, are well suited for use with respect to various portable or cordless devices, such as power tools (e.g., drills, saws, grass trimmers, blowers, sanders, etc.), small appliances (e.g., mixers, blenders, coffee grinders, etc.), communications devices (e.g., smartphones, personal digital assistants, etc.), and office equipment (e.g., computers, tablets, printers, etc.). For example, the improved power and energy density characteristics of such batteries and battery packs facilitates extended use of such portable or cordless devices, motors and/or other components of increased power in the portable or cordless devices, etc. Additionally or alternatively, the improved power and energy density characteristics of such batteries and battery packs facilitates portable or cordless devices or reduced size and/or weight.

Although embodiments of batteries and battery packs implemented in accordance with concepts of the present invention have been described with reference to use in various portable or cordless devices, it should be appreciated that use of such batteries and battery packs is not so limited. Batteries and battery packs configured to provide high power and high energy density in accordance with concepts herein may, for example, be utilized in powering such devices as electric vehicles, backup/uninterruptable power supplies, etc.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, the scope of the present application is not intended to be limited to the particular embodiments of the process, machine, manufacture, composition of matter, means, methods and steps described in the specification.

What is claimed is:

1. A lithium-ion battery (LiB) comprising:
    an anode;
    a cathode;
    an electrolyte;
    a cylindrical housing, wherein the anode and cathode are juxtaposed in a roll configuration in which each of the anode and the cathode comprise a concentric spiral portion that is interleaved with the concentric spiral portion of the other within the cylindrical housing, wherein the electrolyte is disposed between facing surfaces of the anode and the cathode in the roll configuration;
    a continuous electrode member of a first electrode configuration disposed along a first longitudinal edge of a first electrode of the LiB, wherein the first electrode is either the anode or the cathode and a second electrode of the LiB is the other of the anode or the cathode, the continuous electrode member comprising a continuous length of first electrode material over a length greater than twice a size of an outer circumference of the roll configuration and extending beyond a first end of the concentric spiral portion of the first electrode that is interleaved with the second electrode in the roll configuration, wherein adjacent concentric portions of the continuous length of the first electrode material are compressed together forming a compressed uniform surface directly coupled to a negative terminal or a positive terminal of the cylindrical housing; and
    a plurality of electrode tabs of a second electrode configuration disposed along a second longitudinal edge of the second electrode, the plurality of electrode tabs comprising tabbed instances of second electrode material unequally spaced over the length greater than twice the size of the outer circumference of the roll configuration and extending beyond a second end of the concentric spiral portion of the second electrode that is interleaved with the first electrode in the roll configuration, wherein adjacent concentric portions of the tabbed instances of second electrode material are compressed together forming a compressed single tab unit having a juxtaposed alignment of the plurality of electrode tabs coupled to a solder pad of battery monitoring electronics disposed between the second electrode and the other of the negative terminal or the positive terminal of the cylindrical housing, wherein:
    the first electrode configuration and the second electrode configuration configure the LiB to deliver 110 Watt hours per kilogram (Wh/kg) while discharging at greater than 2 kiloWatts per kilogram (kW/kg).

2. The LiB of claim 1, wherein:
    at least one of the anode or the cathode comprises a first planar body rolled in the roll configuration along a first longitudinal axis of the first planar body, and the other of the anode or the cathode comprises a second planar body rolled in the roll configuration along a second longitudinal axis of the second planar body.

3. The LiB of claim 2, wherein:
the first electrode configuration is continuously coupled to the negative terminal or the positive terminal of the cylindrical housing along the first longitudinal edge, and
the cathode comprises a conductive material coated with a lithium oxide alloy, and the anode comprises a conductive material coated with graphene.

4. The LiB of claim 2, wherein:
the tabbed instances of second electrode material unequally spaced over the length greater than twice the size of the outer circumference of the roll configuration are configured to line up in juxtaposition when the first planar body is rolled in the roll configuration.

5. The LiB of claim 1, wherein:
the LiB is one of a plurality of LiBs forming a battery pack, and
each LiB of the plurality of LiBs is configured to deliver greater than 110 Watt hours per kilogram (Wh/kg) while discharging at greater than 2 kiloWatts per kilogram (kW/kg).

6. The LiB of claim 5, wherein the plurality of LiBs comprises a pack construction selected from the group consisting of:
a 10 serial 1 parallel (10S1P) construction;
a 10 serial 2 parallel (10S2P) construction;
a 10 serial 3 parallel (10S3P) construction; and
a 20 serial 3 parallel (20S3P) construction.

7. A cylindrical battery comprising:
an anode;
a cathode;
an electrolyte; and
a cylindrical housing, wherein:
the anode and cathode are juxtaposed in a roll configuration in which each of the anode and the cathode comprise a concentric spiral portion that is interleaved with the concentric spiral portion of the other within the cylindrical housing,
the electrolyte is disposed between facing surfaces of the anode and the cathode in the roll configuration,
at least one of the anode or the cathode comprises a first planar body rolled in the roll configuration along a first longitudinal axis of the first planar body, wherein a first electrode of the cylindrical battery is either the anode or the cathode and a second electrode of the cylindrical battery is the other of the anode or the cathode, and
the first electrode includes a continuous electrode member of a first electrode configuration disposed along a first longitudinal edge of the first planar body, the continuous electrode member comprising a continuous length of first electrode material over a length greater than twice a size of an outer circumference of the roll configuration and extending beyond an end of the concentric spiral portion of the first electrode that is interleaved with the second electrode in the roll configuration, wherein adjacent concentric portions of the continuous length of the first electrode material are compressed together forming a compressed uniform surface directly coupled to a negative terminal or a positive terminal of the cylindrical housing; and
the second electrode includes a plurality of electrode tabs of a second electrode configuration disposed along a second longitudinal edge of the second electrode, the plurality of electrode tabs comprising tabbed instances of second electrode material unequally spaced over the length greater than twice the size of the outer circumference of the roll configuration and extending beyond a second end of the concentric spiral portion of the second electrode that is interleaved with the first electrode in the roll configuration, wherein adjacent concentric portions of the tabbed instances of second electrode material are compressed together forming a compressed single tab unit having a juxtaposed alignment of the plurality of electrode tabs coupled to a solder pad of battery monitoring electronics disposed between the second electrode and the other of the negative terminal or the positive terminal of the cylindrical housing, wherein:
the first electrode configuration and the second electrode configuration configures the cylindrical battery to deliver 110 Watt hours per kilogram (Wh/kg) while discharging at greater than 2 kiloWatts per kilogram (kW/kg).

8. The cylindrical battery of claim 7, wherein the first electrode configuration is continuously connected to the negative terminal or the positive terminal of the cylindrical housing along a longitudinal edge of the first electrode configuration of the continuous length of first electrode material.

9. The cylindrical battery of claim 7, wherein the second electrode configuration comprises:
the tabbed instances of second electrode material unequally spaced over the length greater than twice the size of the outer circumference of the roll configuration are configured to line up in juxtaposition when the first planar body is rolled in the roll configuration.

10. The cylindrical battery of claim 7, wherein:
the cylindrical battery is a lithium-ion battery (LiB),
the cylindrical battery is one of a plurality of cylindrical batteries forming a battery pack, and each cylindrical battery of the plurality of cylindrical batteries is configured for the battery pack delivering greater than 110 Watt hours per kilogram (Wh/kg) while discharging at greater than 2 kiloWatts per kilogram (kW/kg).

11. A method comprising:
juxtaposing a first planar body of an anode and a second planar body of a cathode of a cylindrical battery in a roll configuration in which each of the anode and the cathode comprise a concentric spiral portion that is interleaved with the concentric spiral portion of the other with an electrolyte disposed between facing surfaces of the first and the second planar bodies, wherein a first electrode of the cylindrical battery is either the anode or the cathode and a second electrode of the cylindrical battery is the other of the anode or the cathode, wherein:
the first electrode comprises a continuous electrode member of a first electrode configuration disposed along a first longitudinal edge of the first planar body or of the second planar body, the continuous electrode member comprising a continuous length of first electrode material over a length greater than twice a size of an outer circumference of the roll configuration and extending beyond a first end of the concentric spiral portion of the first electrode that is interleaved with the second electrode in the roll configuration, wherein adjacent concentric portions of the continuous length of the first electrode material are compressed together forming a compressed uniform surface directly coupled to a positive terminal or a negative terminal of the cylindrical battery; and the second electrode comprises a plurality of electrode tabs of a second electrode configuration disposed along a second longitudinal edge of the first planar body or of the second planar body, the plurality of electrode tabs comprising tabbed instances of second electrode material unequally spaced over the length greater than twice the size of the outer circumference of the roll configuration and extending beyond a second end of the concentric spiral portion of the second electrode that is interleaved with the first electrode in the roll configuration, wherein adjacent concentric portions of the tabbed instances of second electrode material are compressed together forming a compressed single tab unit having a juxtaposed alignment of the plurality of electrode tabs coupled to a solder pad of battery monitoring electronics disposed between the second electrode and the other of the positive terminal or the negative terminal of the cylindrical battery, wherein the first electrode configuration and the second electrode configuration configure the cylindrical battery to deliver 110 Watt hours per kilogram (Wh/kg) while discharging at greater than 2 kiloWatts per kilogram (kW/kg);

disposing the first and the second planar bodies within a cylindrical housing; and coupling the electrode material of the at least one of the anode or the cathode to the positive terminal or the negative terminal of the cylindrical battery.

12. The method of claim 11, wherein the continuous length of the first electrode material is substantially equal to the length of the first longitudinal edge of the first planar body.

13. The method of claim 11, wherein the coupling the electrode material to the negative terminal or the positive terminal comprises:

coupling the first electrode configuration to the negative terminal or the positive terminal of the cylindrical battery so that the first electrode configuration is continuously connected along the first longitudinal edge of the first electrode configuration of the continuous length of electrode material.

14. The method of claim 11, wherein:

the plurality of electrode tabs comprises at least 8 tabbed instances of the second electrode material, and the coupling the electrode material to the terminal comprises:

coupling the compressed single tab unit to the solder pad of battery monitoring electronics disposed between the second electrode and the negative terminal or the positive terminal of the cylindrical battery.

15. The LiB of claim 1, wherein the first electrode material is disposed along the first longitudinal edge of the first electrode prior to winding the first electrode into the roll configuration.

16. The method of claim 11, further comprising:

smoothening a distal edge of the first electrode material, wherein smoothening the distal edge of the electrode material comprises:

trimming a portion of the electrode material, compressing together a plurality of the adjacent concentric portions, and folding or rolling over adjacent ones of the concentric spiral portions that are compressed together to form the compressed uniform surface.

17. The LiB of claim 1, wherein the LiB is one of a plurality of LiBs forming a battery pack, and wherein the plurality of LIBs comprise a pack construction selected from the group consisting of:

a 10 serial 1 parallel (10S1P) construction, a 10 serial 2 parallel (10S2P) construction, and a 10 serial 3 parallel (10S3P) construction.

18. The LiB of claim 1, wherein the LiB is one of a plurality of LiBs forming a battery pack, and wherein the plurality of LIBs comprise a 20 serial 3 parallel (20S3P) construction.

19. The method of claim 11, further comprising:

forming a battery pack comprising a plurality of cylindrical batteries that include the cylindrical battery, wherein the battery pack comprises a pack construction of a 20 serial 3 parallel (20S3P) construction.

20. The LiB of claim 1, wherein the continuous length of the continuous electrode member is greater than twice a size of an outer circumference of the roll configuration and less than a length of the first longitudinal edge of the first electrode.

21. The LiB of claim 1, wherein the continuous length of the continuous electrode member is greater than twice a size of an outer circumference of the roll configuration and is half a length of the first longitudinal edge of the first electrode.

22. The cylindrical battery of claim 7, wherein the continuous length of the continuous electrode member is greater than twice a size of an outer circumference of the roll configuration and less than a length of the first longitudinal edge of the first electrode.

23. The cylindrical battery of claim 7, wherein the continuous length of the continuous electrode member is greater than twice a size of an outer circumference of the roll configuration and is half a length of the first longitudinal edge of the first electrode.

24. The method of claim 11, wherein the continuous length of the continuous electrode member is greater than twice a size of an outer circumference of the roll configuration and less than a length of the first longitudinal edge of the first electrode.

25. The method of claim 11, wherein the continuous length of the continuous electrode member is greater than twice a size of an outer circumference of the roll configuration and is half a length of the first longitudinal edge of the first electrode.

* * * * *